United States Patent [19]

McDougall

[11] Patent Number: 5,279,071
[45] Date of Patent: Jan. 18, 1994

[54] AUTOMATIC TREE AND/OR PLANT WATERER

[76] Inventor: Dale McDougall, R.R. #1, Sackville, New Brunswick, Canada, E0A 3C0

[21] Appl. No.: 753,042

[22] Filed: Aug. 30, 1991

[51] Int. Cl.$^5$ ............................................. A47G 7/02
[52] U.S. Cl. ....................................... 47/40.5; 47/79; 47/82
[58] Field of Search ............................ 47/40.5, 79, 82

[56] References Cited

U.S. PATENT DOCUMENTS

| | | | |
|---|---|---|---|
| 1,453,401 | 5/1923 | Mattson | 47/79 |
| 3,410,457 | 11/1968 | Brown | 47/48.5 |
| 3,697,026 | 10/1972 | Hambrick | 47/40.5 |
| 4,825,587 | 5/1989 | Stancil | 47/40.5 |
| 4,930,252 | 6/1990 | Krause et al. | 47/40.5 |
| 4,993,176 | 2/1991 | Spinosa | 47/40.5 |
| 5,076,009 | 12/1991 | Cibor | 47/40.5 |

Primary Examiner—Carl D. Friedman
Assistant Examiner—Wynn Wood
Attorney, Agent, or Firm—Martin J. Marcus

[57] ABSTRACT

A novel automatic tree waterer is provided herein. It is adapted to be connected to a stand which holds a tree, e.g. a Christmas tree, in an upright position. The waterer includes a hollow support base and a hollow two-piece body section. The lower body section is assembled to the support base by means of a slide coupled lip/coupling support lip to be airtight and watertight. The upper body section is assembled to the lower body section by means of male/female threads to be airtight and watertight. The upper body includes a male threaded upper neck. A hat including an inner well with interlock threads is assembled to the upper body by means of the male/female threads to be airtight and watertight. A water outlet is provided from the interior of the body section. A flow controller unit is connected to the water outlet to close the water outlet to enable filling the interior of the hollow two-piece section with water. A hose is adapted to be connected between the flow controller and the stand which holds the tree. Once the flow of water is commenced, a cyclic automatic flow of water ensues. The water will not flow unless air is allowed to enter through the tube. Thus, when the end of the tube is submerged in water, no water can flow.

6 Claims, 3 Drawing Sheets

AUTOMATIC TREE AND/OR PLANT WATERER

BACKGROUND OF THE INVENTION (i) Field of the Invention

This invention relates to a stand assembly for a Christmas tree or the like. More particularly, it relates to such a stand assembly including a stand to hold the tree and a container for a supply of water whereby a live tree, or a cut tree, or a cut portion of a tree (e.g. a cut-off limb or tip) can be irrigated with water. It should be understood that "water" is meant here to include nutrient, preservative, and fire-retardant solutions as well as plain water.

(ii) Description of the Prior Art

Many Christmas tree stands and holders have been provided by the prior art. Some of such stands come apart for storage, and many of them held some water in a cavity or cup around the bottom of the severed tree portion. Some trees can absorb as much as a couple of quarts of water daily, and keeping them irrigated is thought to be very desirable.

There, thus, exists a need for automatically watering such trees so that they may be left unattended for long periods of time.

U.S. Pat. No. 1,453,401 patented May 1, 1923 by M. W. Mattson, attempted to solve this problem by providing a plant waterer which included a water receptacle provided with an annular series of outlet openings adjacent the bottom of the receptacle. A single common closure was provided for all of the openings, which was insertable and openable from the top of the receptacle for completely or partially closing communication through the opening. Individual closing means are provided for each of the openings. The aim of that device was to provide a device which would simultaneously irrigate a plurality of plants without any attention from the user and to provide a portable plant waterer which may be conveniently handled and which will dispense the water in any desired volume and in a concentrated jet to prevent splashing or displacement of the water. However, such device was unsuitable to provide for the watering of a Christmas tree, i.e. a cut tree, so that it would not dry out and hence become a fire hazard.

U.S. Pat. No. 3,900,134 patented Aug. 19, 1975 by H. B. Larson, attempted to solve this problem by providing an automatic watering device which was said to be able to apply water to potted plants after a predetermined and adjustable interval of time. The invention included a relatively large container that was filled with a quantity of water sufficient to irrigate the plants. The container had a relatively small discharge opening to avoid substantial evaporation therefrom and was supported for pivotal movement about an axis that was displaced from the centre of gravity or balance point of the container. There was thus a tipping moment on the container which tended to tip the container to a water discharging position. For counter balancing such tipping moment, a lever arm extended from the container. Secured to the lever arm remote from the container was a relatively small container or dish. The volume of the small container and the distance from the pivot axis were such that when the small container was filled with a pre-determined amount of water it would counteract the tipping moment and retain the large container in an upright position. The small container or dish had a large opening so that the water therein was subject to evaporation. When the water evaporated to an extent that the weight thereof was insufficient to maintain the large container in an upright position, the main container tipped and discharged water into a potted plant disposed therebelow. The interval between the time the apparatus was set up and the time it discharged the water was adjustable. Such adjustability could be achieved by regulating the amount of water introduced into the small container or dish or by adjusting the position of such dish along the lever arm. However, such device was complex and was unsuitable to provide for the water of a Christmas tree, i.e. a cut tree, so that it would not dry out and hence become a fire hazard.

U.S. Pat. No. 4,060,934 patented Dec. 6, 1977 by L. L. Scaggs, attempted to solve this problem by providing an automatic water tender which was said to be able to water a plant in accordance with the amount of moisture which had evaporated or had been transpired from the plant. The apparatus comprised a support base upon which a horizontal pivot shaft was pivotally mounted. A cantilever platform was rigidly mounted to the pivot shaft and a counter weight was mounted to the pivot shaft opposite to the cantilever platform. A plant container was supported by the cantilever platform, which contained the plant to be watered. The plant container on the platform was counter-balanced about the pivot shaft by the counter weight. A fluid reservoir was mounted on the support base in an elevated position with respect to the plant container. A valve means was mounted on the fluid reservoir and was operatively connected to the pivot shaft, for controllably conducting fluid from the reservoir to the plant container in response to the pivotal motion which the pivot shaft undergoes when the counter weight overbalances the platform. In this manner, the plant in the container was automatically watered after a predetermined loss of weight of water by the plant through evaporation and plant transpiration. However, such device was complicated in structure, relied upon a valve means and was unsuitable to provide for the watering of a Christmas tree, i.e. a cut tree, so that it would not dry out and hence become a fire hazard.

U.S. Pat. No. 4,121,608 patented Oct. 24, 1978 by E. MacLeod, attempted to solve this problem by providing a moisture responsive liquid metering device for use in controlling the amount of liquid delivered to a given location according to the moisture level at that location. The device included a flexible tube through which the liquid flows from one location to another as from a container of water to a potted plant. A valving device comprised of a wooden tubular sleeve and an elongated valve core are provided for opening and closing the tube in a squeezing action. The valve core was provided with an opening at one end through which the tube was threaded in close proximity to one end of the wooden sleeve which was substantially coextensive with the core. The device was planted in soil, for example, and when the soil was damp, the moisture caused the wooden sleeve to expand to pinch the tubing shut. As the soil dried out the sleeve contracted, releasing pressure on the tube and allowing water to flow. However, such device was complicated in structure, relied upon a valve means, and was unsuitable to provide for the watering of a Christmas tree, i.e. a cut tree, so that it would not dry out and hence become a fire hazard.

Watering systems have also been provided for use in systems commonly referred to as "hydroponic systems" wherein a plant root system is mechanically supported in an inert medium while the plant is fed a nutrient solution consisting of metered amounts of an exact formulation.

Such prior watering systems have utilized pumps in an attempt to deliver the proper amount of nutrient to the plant which are controlled by timing circuits so as to deliver only a required amount of nutrient solution at proper intervals. While such operations may be suitable for commercial operations, such are not suitable for the average individual as they are costly and require rather sophisticated installations. Other systems have sought to utilize wick feeding of the nutrient solution but a problem arises in that much of the nutrient is filtered out in the wick, and cannot furnish nutrient solution fast enough to large plants. None of these systems were adaptable for the watering of Christmas trees.

For example, U.S. Pat. No. 4,148,155 patented Apr. 10, 1979 by D. J. Allen, provided a system and apparatus for growing plants in a nutrient solution while they were supported in an inert medium contained in a pot container. The system included a nutrient solution reservoir and automatic feeder apparatus for maintaining a predetermined level of nutrient solution in the container. A tube member having an open end was connected to the reservoir and was carried a predetermined distance above the container bottom for dispensing the solution. An air vent communicated with the tube member allowing air to enter the reservoir in response to the level of nutrient solution in the container falling below the open end of the tube member as the solution was drawn by capillary action through the media into the roots. The nutrient solution flowed into the container until the open end of the feeder tube was covered so as continuously to maintain the level of nutrient solution. An overflow opening drains excess liquid from the pot prevented overwater and stagnation when used outdoors. However, such device required an open access to the atmosphere, thereby being uneconomical in liquid usage and was unsuitable to provide for the watering of a Christmas tree, i.e. a cut tree, so that it would not dry out and hence become a fire hazard.

U.S. Pat. No. 4,291,836 patented Sep. 29, 1981 by W. Chen-Hsiung, provided apparatus for intermittently supplying a predetermined quantity of water at regular, predetermined intervals. Such patented apparatus included a water tank for accumulating and storing water and water feeding means and inlet valve means. Float-actuated valve means were provided within the water tank. A down pipe was connected to the water tank and terminated in a tapered tube. A siphon tube was provided from the water tank terminating in a tapered tube which extended together with the tapered tube of the down pipe into a venturi outlet. An ejector tube extended downwardly from the venturi outlet. However, such device required a float operated valve means and was unsuitable to provide for the watering of a Christmas tree, i.e. a cut tree, so that it would not dry out and hence become a fire hazard.

Watering systems have also been provided for irrigating plants, particularly for hydroponics and hanging plants for propagating plants. Earlier devices for watering hanging plants or for hydroponic irrigation have been developed. For example, U.S. Pat. No. 2,983,076 to Merrill described a watering device for house plant containers that utilized a hand pump mechanism. A bulb was used to pump air into a liquid-containing chamber. This forced liquid into the bottom of a tube for flow upwardly into gravel. However, such device required a pump and a valve and was unsuitable to provide for the watering of a Christmas tree, i.e. a cut tree, so that it would not dry out and hence become a fire hazard.

U.S. Pat. No. 1,383,368 to Ambrose disclosed a flower pot that included a filling tube which allowed manual watering a plant from the top. However, such device was unsuitable to provide for the automatic watering of a Christmas tree, i.e. a cut tree, so that it would not dry out and hence become a fire hazard.

U.S. Pat. No. 4,300,311 to Marchant disclosed a hydroponic irrigation valve and system. A control valve with an inlet port allowed liquid to pass into or from the container. However, such device required a valve means and thus was unsuitable to provide for the watering of a Christmas tree, i.e. a cut tree, so that it would not dry out and hence become a fire hazard.

In addition, hanging plant waterers are known which comprise a flexible container and a rigid, cone-shaped tube. The bottom of the tube extended through the top of the container to the bottom of the container. Water was forced up the tube to the downwardly curved upper end to water the plant when the container was manually squeezed. However, such device was unsuitable to provide for the automatic watering of a Christmas tree, i.e. a cut tree, so that it would not dry out and hence become a fire hazard.

U.S. Pat. No. 4,447,983 patented May 15, 1984 by J. Shirada, provided an apparatus for irrigating plants. Such patented apparatus included a planter having a container for a growing medium. A liquid reservoir was disposed below the container. Openings were provided between the reservoir and the container, permitting a flow of liquid from the reservoir to the container. A filler conduit communicated with the reservoir. A float chamber was near the top of the reservoir. A float chamber conduit extended from the reservoir to the float chamber. A normally closed air valve was operatively connected to a float in the float chamber so the float opened the valve when liquid from the reservoir rose in the float chamber. An air conduit was connected to the valve so pressurized air from the air conduit was discharged when the valve opened. A closed liquid container was normally positioned below the planter. A liquid conduit communicated with the insides of the container near the bottom thereof and was connected to the filler conduit. An air pump was also provided for pressurizing the liquid container. However, such device required air under pressure and an air pump and therefore was unsuitable to provide for the watering of a Christmas tree, i.e. a cut tree, so that it would not dry out and hence become a fire hazard.

U.S. Pat. No. 3,981,446 provided an irrigation method which utilized part of the liquid being supplied for irrigation to generate air pressure or vacuum which operated a diaphragm valve that shut off flow whenever air was unable to pass through a porous sensor in the soil because the soil contained adequate moisture to fill the pores in the sensor. Air must flow through the sensor continuously while irrigation was in progress and, only after air flow was stopped, the energy of the irrigating liquid under the pull of gravity is used mechanically to stop liquid flow. However, such device, by requiring continuous air flow, was unsuitable to provide for the watering of a Christmas tree, i.e. a cut tree, so that it would not dry out and hence become a fire hazard.

U.S. Pat. No. 4,321,937, issued Mar. 30, 1982, operated on the principle whereby a valve device used the pressure of air entrapped in a passage between an upper liquid supply container and counter-balancing liquid retained lower in the passage to prevent outflow of liquid from the container until air was released by a control device which detected the need for moisture in a zone of liquid use. The released air was replaced by liquid which initiated outflow by rising in a column of increasing weight and pressure which acted to oppose and overcome the pressure of the entrapped air and counterbalancing liquid which had been preventing outflow of liquid from the container. Liquid then flowed out until the container was empty, after which it refilled from a liquid source through a restricted conduit or other flow-limiting means. Restricting inflow ensured that, once outflow had started, the container emptied faster than it refilled, allowing air to become entrapped in the passage after each flow cycle to prevent further outflow from the container until the control device again releases air. However, such device, by requiring trapped air in water flow passages, was unsuitable to provide for the watering of a Christmas tree, i.e. a cut tree, so that it would not dry out and hence become a fire hazard.

U.S. Pat. No. 4,321,937, issued Mar. 30, 1982, utilized an additional, secondary portion of counterbalancing liquid, which was not expelled by moderate fluctuations in supply level, but was expelled by a rise in the flow-triggering column of liquid when air escaped through the detector. When the secondary portion of liquid is expelled, it triggered outflow from the container. However, such device, by requiring the escape of entrapped air, was unsuitable to provide for the watering of a Christmas tree, i.e. a cut tree, so that it would not dry out and hence become a fire hazard.

U.S. Pat. No. 4,542,762 patented Sep. 24, 1985 by B. M. Littlehale, provided an automatic liquid delivery apparatus which employed no moving parts and required no external source of energy except gravity to operate. It dispensed liquid from a constantly available source, which was open to the atmosphere, to a receiver or zone requiring liquid in response to a detector which was located in the zone and initiated discharge of the liquid. The apparatus included a valve device which retained liquid against discharge from a container or supply by air pressure confined in a space in a passage. The valve device delivered liquid through the passage when air in the space was released by a control device. The control device was a detecting mechanism or other automatic operating element. The detecting mechanism can sense the moisture level in soil, in liquid, in roots growing in moist air, in plant tissues or any other location where moisture differentials can be detected. However, such device, by requiring a valve device and a central mechanism was complicated and was unsuitable to provide for the watering of a Christmas tree, i.e. a cut tree, so that it would not dry out and hence become a fire hazard.

There have been many prior inventions concerning the better watering and/or feeding of plants in containers and also for the watering of cut flowers in a vase even for their limited times of enjoyment. By way of example, Charles E. Reynolds in U.S. Pat. No. 1,842,687, described a structure for automatically dispensed water from a container which was placed in a vase among cut flowers. The principle utilized was: water will not flow from an airtight receptacle unless air was admitted thereto. When a level of water in a vase or pot, or other container dropped to the bottom of an air tube depending from the receptacle, air was permitted to pass up into the receptacle, and water or other liquid is discharged from the tube or from other means, until the level of the water in the container again rose to cover the bottom of the air tube, thereby shutting off the flow of air and water and/or other liquid. However, the structure of such device was unsuitable to provide for the watering of a Christmas tree, i.e. a cut tree, so that it would not dry out and hence become a fire hazard.

Hermann Rohling in U.S. Pat. No. 3,438,575 described a structure for a root controlled watering device utilizing this same principle in several other embodiments of apparatus, some of which were connected to irrigation supply systems to replenish the water tanks, i.e. the receptacle. However, such device was unsuitable to provide for the watering of a Christmas tree, i.e. a cut tree, so that it would not dry out and hence become a fire hazard.

Gary G. Bates, in U.S. Pat. No. 3,754,352, provided a device for watering trees and plants, which delivered water to root locations, when the roots were soon to be dry, utilizing this same principle, wherein water was held in a receptacle until the water seal below ground level was broken, allowing air to reach the space above the water in the receptacle and eliminate the vacuum. However, such device was unsuitable to provide for the watering of a Christmas tree, i.e. a cut tree, so that it would not dry out and hence become a fire hazard.

Hermann Rohling provided another watering device in U.S. Pat. No. 3,856,205 which was a structure for the proper watering of potted plants using small size apparatus having no moving parts. Over a period of time, the water evaporated from the soil and/or was absorbed by the roots of the plant. Thus, the water level in the pot lowered below the bottom opened end of a tube, thereby allowing air to flow through the soil and into the tube and subsequently into the container, i.e. receptacle. Thereby the vacuum was relieved, causing water to flow again, until a subsequent equilibrium was reached. Although that apparatus was small and had no moving parts, many especially formed components were assembled to complete the watering device. However, such device was complicated and thus unreliable in operation, and thus was unsuitable to provide for the watering of a Christmas tree, i.e. a cut tree, so that it would not dry out and hence become a fire hazard.

Donavan J. Allen in U.S. Pat. No. 4,148,155, provided a system for automatically feeding plants, wherein water and/or a plant food nutrient flowed out of a receptacle, until the sufficient quantity of such liquid in the soil, sealed off the bottom vent opening, i.e. bottom of an inserted tube. Bottles were used as reservoirs or receptacles. However, such device was unsuitable to provide for the watering of a Christmas tree, i.e. a cut tree, so that it would not dry out and hence become a fire hazard.

U.S. Pat. No. 4,578,897 patented Apr. 1, 1986 by R. A. Pazar provided a plant watering and/or feeding unit which automatically and periodically dispensed water as needed. As assembled, an air tube extended essentially throughout the central length of a selected plastic bottle and beyond the otherwise sealed cap entry of this plastic bottle for insertion of the extending, first heat sealed then partially cut opened, air tube end, down through the soil without being blocked by any entering soil, to contact the bottom of the earth filled plant container. A liquid orifice was located in the plastic bottle in its shoulder about midway between the entry and the side of the bottle. During plant watering and/or feeding cycles, liquid dripped from the liquid orifice in the shoulder, until the water table in soil i.e. the liquid level in the soil, rose above the end of the partially opened air tube to seal off the entry of air. Then the dripping of liquid stopped, until this liquid level dropped below the end of the partially opened air tube. With the liquid seal broken once again the vacuum volume above the liquid level in the bottle became a pressure air volume, and liquid dripped out the orifice and into the soil. This cycle continued until the prefilled volume of watering and/or feeding liquid was depleted. In this patent an aperture was provided whereby air flowed into the bottle when the water level dropped below the opening, thereby allowing water to exit via another hole in the shoulder of the bottle. However, such device was unsuitable to provide for the watering of a Christmas tree, i.e. a cut tree, so that it would not dry out and hence become a fire hazard.

U.S. Pat. No. 4,653,224 patented Mar. 31, 1987 by E. C. Weckesser, provided a Christmas tree irrigating device for supplying water to an open cup around the base of such tree. The device comprised a tree-holding stand section having a cavity for receiving the base of a severed tree or portion of a tree. The cavity was capable of retaining an initial volume of water in contact with the base. A container was adjustable as to elevation for holding a reserve volume of water for the cavity but apart therefrom. A flexible water conduit interconnected a volume of water in the cavity with a volume of water in the container. The stand section subcombination included an inlet tube integral with or separatable from the water cavity in the stand, the tube reaching near to the bottom of said cavity. The reserve container and conduit included a container with a flexible conduit for water leading therefrom, and the other end of the conduit has a fastener for attachment to the tree base or to the stand. However, such device was complex in structure and complicated in operation and thus was not practically suitable to provide for the watering of a Christmas tree, i.e. a cut tree, so that it would not dry out and hence become a fire hazard.

There are many types of automatic plant watering apparatus systems which are actuated in response to water loss by the plants. However, these apparatus suffer from a number of disadvantages such as, for example, they require complex mechanism to operate and they are difficult to install in that a variety of complex apparatus are required to assemble them. Furthermore, they are provided with an elevated water reservoir with a spring loaded valve therein which is actuated by the loss of weight of water by the plants in a container supported by the spring. Since the springs lose their strength as the temperature increases, plants are frequently overwatered on hot days.

U.S. Pat. No. 4,760,666 patented Aug. 2, 1988 by J. Han, provided a watering device for plants which included a plant container which was balanced on a horizontal pivot rod by an adjusting weight member. A water reservoir tank was operatively associated with the plant container so that as the plant container became lighter as to a loss of water, the adjusting weight member disposed at the opposite end of the horizontal pivot rod from the plant container actuated a valve in the water reservoir tank and transferred water from the water reservoir tank to the plant container until a balance is again achieved. When the balance was reached, the valve in the water tank is again closed. However, such device, in requiring a valve mechanism, was unsuitable to provide for the watering of a Christmas tree, i.e. a cut tree, so that it would not dry out and hence become a fire hazard.

U.S. Pat. No. 4,848,029 patented Jul. 18, 1989 by J. Han, provided a watering device for plants which included horizontal parallel pivot rods and a plant container which was balanced on one of the horizontal pivot rods by an adjusting weight member slidably disposed at the other horizontal pivot rod. A water reservoir tank is operatively associated with the plant container so that as the plant container became lighter as to a loss of water, the adjusting weight member operatively associated with the plant container actuated a valve in the water reservoir tank through a transfer member mounted to a third one of horizontal parallel pivot rods and transfer water from the water reservoir tank to the plant container until a balance was again achieved, and when the balance is reached, the valve in the water tank is again closed. However, such device, by requiring valve means was complicated and thus was unsuitable to provide for the watering of a Christmas tree, i.e. a cut tree, so that it would not dry out and hence become a fire hazard.

Canadian Patent No. 881,224 patented Sep. 21, 1971 by H. Simon et al, provided a water container or receptacle having at least one porous body with open pores, provided below the water level and extending through one wall of the receptacle into an area which is to be watered, the porous body being secured in the wall of the container and open at both sides of this wall at least at its ends. A constant, slow, controlled water flow from the water receptacle to the material or plant area which was to be watered took place via the porous body. For irrigating larger sized areas such as flowerbeds it was expedient to use a water receptacle the bottom of which is connected to a water pipe preferably made of plastic material leading from the receptacle to the flower bed. Porous bodies may protrude laterally along the length of the pipe to maintain a water flow connection from the water to receptacle to the area to be watered. However, such device, by requiring a complicated porous body which could be unreliable, was unsuitable to provide for the watering of a Christmas tree, i.e. a cut tree, so that it would not dry out and hence become a fire hazard.

SUMMARY OF THE INVENTION (i) Aims of the Invention

Although these prior inventions could have successfully utilized this principle to water plants on the demand of the lack of water in the locale of the roots, presently it is believed there is no widespread use of such inventions utilizing this principle. Those offered previously, for example, may have unwontedly had their below soil vents easily clogged by soil, which entered excessively and/or compactedly when their vented portions were inserted into the soil or moved around in the soil. Moreover, such device was unsuitable to provide for the watering of a Christmas tree, i.e. a cut tree, so that it would not dry out and hence become a fire hazard.

Accordingly, an object of the present invention is to provide a tree watering device that requires no power so that, if there is power failure during the owner's absence the operation of the device of the invention is not affected.

It is another object of the invention automatically to water plants in an improved manner.

It is yet another object of the present invention to provide means for automatically metering a liquid, e.g. water, from one location, e.g. a water tank, to another location, e.g. a plant pot according to the moisture requirements at the other location.

A further object of the present invention is to provide a watering device for plants, which is easy to assemble or operate and inexpensive to manufacture.

(ii) Statement of Invention

This invention provides an automatic waterer for trees or plants adapted to be connected to a stand which holds a tree in an upright position and collects water, the waterer comprising: a hollow support base, the support base having a roof, a peripheral rim and an arcuate coupling support lip spaced vertically above the roof to provide a slot therebetween; a lower body section, the lower body section having a lower slide-coupled lip and an upper male threaded neck, the lower body including an inner lower roof, the roof having an off-center aperture therein leading to a downwardly-sloping channel, the channel having internal threads to connect it to an externally-threaded flow controller which is connected to a hose; the lower body section being assembled to the support base by cooperative engagement between the slide-coupled lip of the upper body section and the coupling support lip of the lower body section, thereby providing cooperative airtight and watertight interconnection; an upper body section including an integral superposed head, the upper body including a lower base having female threads therein and an upper neck integral with the upper head, the upper neck having male threads thereon; the upper body being assembled to the lower body by engagement between the upper male threaded neck of the lower body section and the female threads of the upper body section with an interposed lock ring, thereby providing cooperative airtight and watertight interconnections; and an upper hat, the hat having an inner well provided with inner threads; the upper hat being assembled to the upper body by engagement between the male threads of the upper body section and the internal threads of the hat with an interposed lock ring, thereby providing cooperative airtight and watertight interconnection; the hose being adapted to be connected between the flow controller and the stand; the automatic waterer operating without further power input to allow water to flow automatically from the interior of the lower body to the stand, the water flow being self-powered by means of an airlock.

(iii) Other Features of the Invention

By one feature of this invention, the automatic waterer includes a plurality of vertically-spaced-apart, transparent viewing ports forming part of the lower body and part of the upper body for visual inspection of the level of water within the upper and lower bodies.

According to another feature of this invention, the downwardly sloping channel slopes at an angle of about 45°.

According to another feature of this invention, the flow controller may be provided with a manually rotatable on/off valve for preventing automatic water flow, or the flow controller may be provided with a push button on/off valve for preventing automatic water flow.

According to another feature of this invention, the automatic waterer is provided in combination with a stand which holds a tree in an upright position, the stand including a clip to secure the hose thereto.

(iv) Generalized Description of the Invention

The automatic waterer of this invention thus has a self-contained, airtight enclosed container which rests on top of a circular elevating base in a slide-coupled locked manner. A small hollow length of tubing depends from the base of the airtight enclosed container at a downward angle, reaching to the tree stand container in which the water level is to be maintained. In this way, the water will not flow from the device unless air is allowed to enter through the tube. Thus, when the tube end is submerged in water, no air or water is exchanged.

BRIEF DESCRIPTION OF THE DRAWINGS

In the accompanying drawings.

Figure 1:
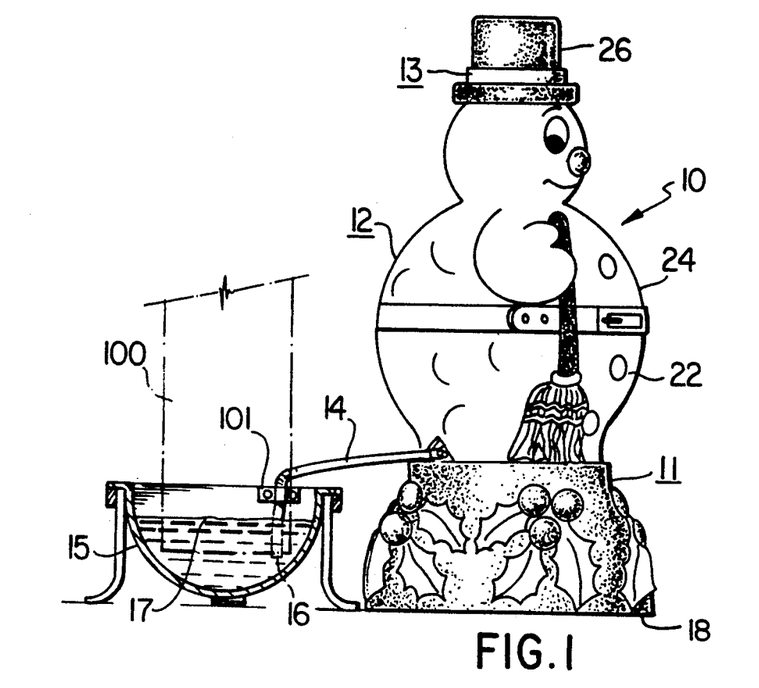
FIG. 1 is a side elevational view of the tree waterer in its connected arrangement with the Christmas tree stand.
Figure 2:
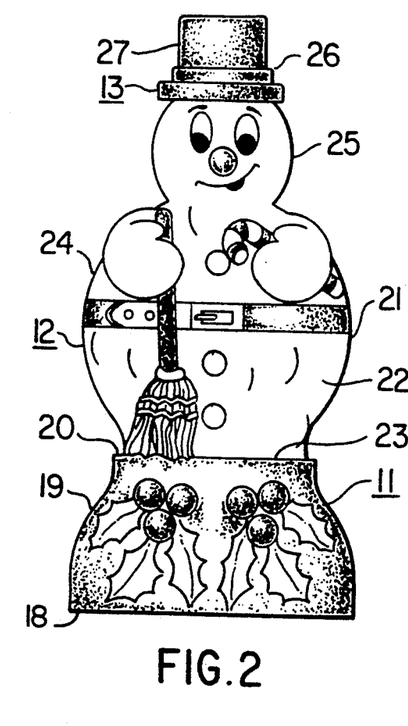
FIG. 2 is a front view of one embodiment of the tree and/or plant waterer of this invention in the decorative personification of a snowman.
Figure 3:
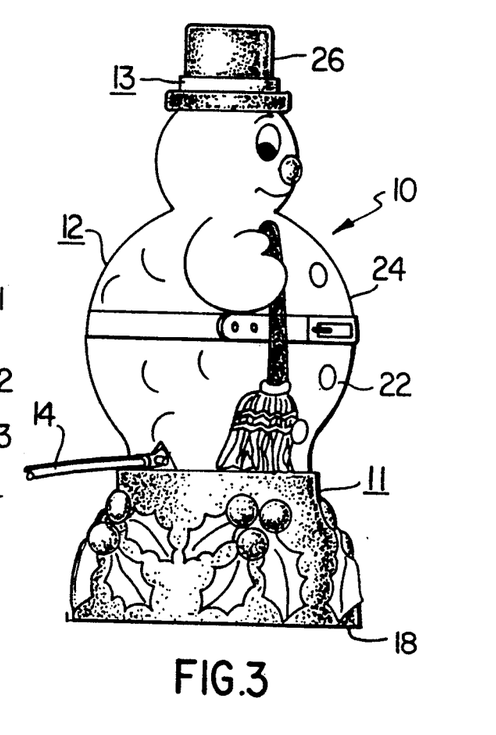
FIG. 3 is a side view of the embodiment of FIG. 2.

DESCRIPTION OF PREFERRED EMBODIMENTS (i) Description of FIGS. 1, 2 and 3

As seen in FIGS. 1, 2 and 3, the tree and/or plant waterer 10 is in the personification of a snowman, including a decorative hollow base, indicated generally as 11, a truncated spherical body indicated generally as 12 and an upper hat indicated generally as 13. The tube 14 is connected to a conventional Christmas tree stand 15, with its open end 16 below the desired water level 17. A clip 110 secures the hose 14 to the stand 15. A Christmas tree 100 is shown in phantom.

As seen more clearly in FIGS. 2 and 3, the decorative hollow base 11 has a wide diameter lower foot 18 and curving inwardly at 19 to a narrower diameter upper portion 20.

Atop the hollow base 11 is a truncated, generally-spherical body 21, namely a lower semi-spherical body section 22, which is slide-coupled at its lower end 23 to the upper portion 20 of the base 11, and an upper semi-spherical body 24 which is secured in a removable, but air-tight fashion, to the lower body section 22. The upper body section 24 includes a spherical head 25. Atop the head 25 is a hat 13, in the form of a hat band 26 and an upper portion 27 which is secured in a removable, but air-tight manner, to the head 25.

All four components, namely the base 11, the lower body section 22, the upper body section 24 and the hat 13 are detachable and fit within each other for convenient packing and storage.

Figure 4:
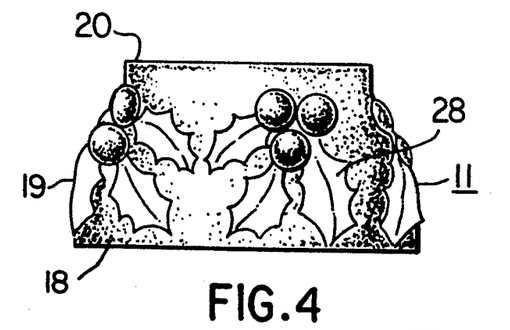
FIG. 4 is a side elevational view of the support base.
Figure 5:
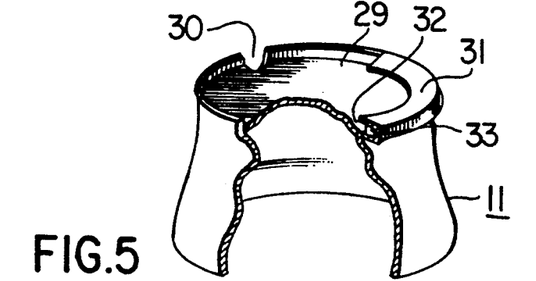
FIG. 5 is a perspective view, partially broken away, of the support base.

(ii) Description of FIGS. 4 and 5

As seen in FIGS. 4 and 5 the support base 11 is provided with a decorative exterior 28. The upper portion 20 is provided with a ceiling 29. The upper portion 20 also includes a circumferential wall 29a which is provided with a recessed notch 30 to accommodate the drain tube 14 (see FIG. 5). About 9/20th of the circumferential wall 29a is provided by a coupling support lip 31, which includes a small space 32 between the lip 31 and the upper ceiling 29.

Figures 6, 7:
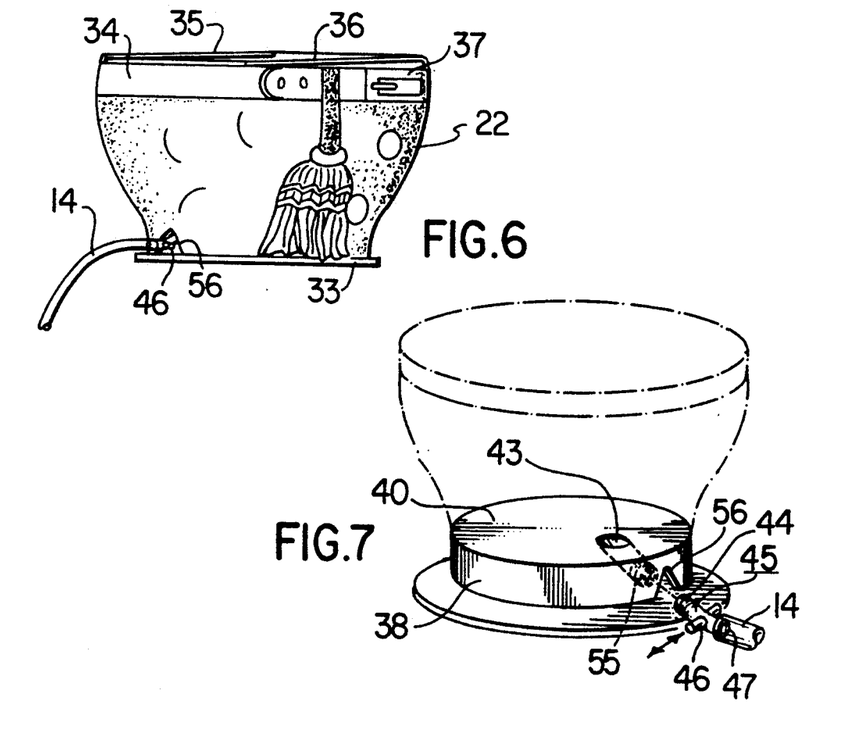
FIG. 6 is a side elevational view of the lower body section.
FIG. 7 is a perspective view, partially broken away of the lower body section.

(iii) Description of FIGS. 6 and 7

As seen in FIGS. 6 and 7, the lower body section 22 includes a lower, slide-coupled lip 33 which mates with the space 32 between the coupling support lip 31 and the ceiling 29. The upper portion 34 is provided with a threaded cylindrical neck 36 having male threads therein. A rubber lock ring 37 is also provided.

The base 38 of lower body section 22 includes a "hat" section 39 constituted by, a roof 40, a cylindrical section 41 and a plate 42 whose perimeter provides a projecting rim which has been previously identified as coupling support lip 31. Threadedly connected to internal threads 55 of off centre aperture 43 is the inlet end 44 of a flow controller unit, indicated generally as 45. Manually actuatable means, shown generally as 46, projects outwardly from the cylindrical section 41. Flow controller unit 45 includes an unthreaded outlet end 47 which projects outwardly through notch 56. Unthreaded outlet end 47 is connected to hose 14. Thus, flow controller unit 45 provides a downwardly sloping, tubular channel for the controlled flow of water from the interior of the "snowman" to the outlet hose 14.

Figure 8:
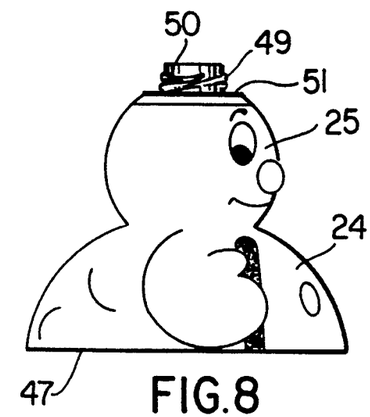
FIG. 8 is a side elevational view of the upper body section.
Figure 9:
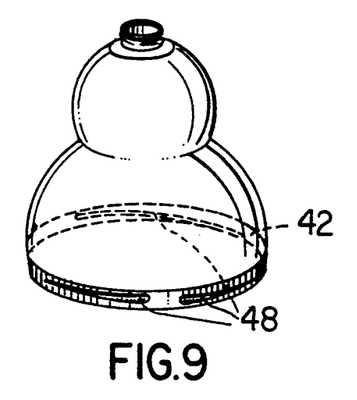
FIG. 9 is a bottom perspective view of the upper body section.
Figure 10:
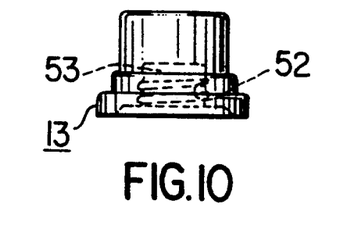
FIG. 10 is a central longitudinal section through the cover, in the form of a hat.

(iv) Description of FIGS. 8, 9 and 10

As seen in FIGS. 8, 9 and 10, the upper body 24 includes a head 25. The lower circumference 47 of the upper body 24 includes three disconnected female threads 48 (see FIG. 9) for fastening to the male threads 36 on the lower body 22.

The head 25 is provided with a cylindrical neck 49 provided with male threads 50 and a rubber lock ring 51.

FIG. 10 shows the hat 13 which includes an inner well 53 provided with internal threads 52 to mate with the male threads 50 in the neck 49.

OPERATION AND USE OF PREFERRED EMBODIMENTS

Advantages of the instant invention over various prior proposals include: convenient and comfortable tree irrigation which is remotely controlled; a sub-combination reservoir and water-feeding tube which is adapted to irrigate many conventional types of conventional tree stands remotely, and which can be attached thereto or to the tree base portion therein; and the sub-combination of a tree-holding stand with water cavity therein for contact with the tree base, such stand having, however, an inlet tube for water which reaches near to the bottom of such cavity and is attachable to a flexible water conduit to a remote water reservoir for use as the instant assembly. Thus, the present invention can be furnished to the user as an assembly ready to take care of the tree, or simply as a tree holder section which can be connected readily with a flexible hose to a pre-existing water reservoir that can be raised and lowered; or even more simply as a reservoir and flexible tubing that can be used with a pre-existing tree stand that has a water-holding cavity in it for irrigating the tree.

This invention has been created specifically for the purpose of watering a live Christmas tree for the duration of its stay indoors during the holiday seasons. It can be used in conjunction with any tree stand or watering bowl people may already have. An aim of this invention which has been achieved is that people would not have to crawl under their tree and over gifts to water their tree anymore. Another aim is to prevent the tree from drying out if not watered, so as to create a fire hazard. It holds enough water to supply a tree for several days (even a couple of weeks for some).

This invention also serves to water plants if they are set into a pan, and can water several plants for a person while they take a vacation.

The base of the watering device can be used and is specifically designed to be used as a plant potter when it is not being used to hold up the watering device.

The watering device is decorative and sits out in plain sight and within reach (in case more water needs to added). The water level can be visually monitored at all times by the clear buttons on the front of the snowman. A little food colouring will make it even easier.

Other products on the market are not practical in the method of delivery of water to the tree, or are they adequate with the volume of the contained supply. Also, none are as decorative as this. It is a SNOWMAN, decoratively painted and may be provided with a real little scarf for around his neck.

In essence, the present invention consists of three pieces to the main body and are assembled with ease. The actual stand for the Christmas tree is not part of the present invention. The three-piece construction is for smaller packaging requirements and requires less storage space. The three pieces are 1) a screw-on hat/cap for water filling; 2) a lower body; and 3) an upper body. The lower and upper body portions screw thread together. A fourth component, a base, is also provided.

All four components, base, lower section, upper section, and hat all detach and fit within each other for convenient packing and storage. It includes an airtight screw on hat (for filling or refilling with water).

A flow controller unit is provided to allow for easy filling and refilling of the tree watering SNOWMAN. Preferably, the flow controller is threaded into the water outlet which is sloped at a 45° angle. The flow controller thus provided a 45° downwardly sloped tubular channel for the controlled outflow of water, which is connected to the flexible hose. The flexible hose runs from the SNOWMAN to the Christmas tree stand.

When filling or refilling the SNOWMAN, the shut-off valve provides the means to stop the flow of water from the SNOWMAN to the Christmas tree stand through the flexible hose. After filling and the connection of the components of the SNOWMAN in an airtight manner, the principle operation of the SNOWMAN is initiated. The valve is turned off and the SNOWMAN unit can have the refilling hat removed and water added, without the escape of water. When the air-tight cap is replaced, the valve can be opened. The operation of the SNOWMAN is once again reactivated.

The watering device may be made of a synthetic plastic material, e.g. polyethylene, polyvinyl chloride, etc., with rubber airtight seals at the middle and filler cap. Capacity should be approximately 8 lit. water. Preferably, it is packaged with a tree food, preservative, and fire retardant.

When the water container is filled, the only way that air and water can move is through the plastic hose into the Christmas tree stand. As the tree uses the water, the water level drops past the end of the stationary hose in the stand. When this happens, water from the container refills the tree stand and air goes up the hose at the same time into the water container.

When the water in the Christmas tree stand reaches back up to the position of the end of the hose, the water flow automatically stops. This cycle keeps repeating for the duration that the tree is kept up. A Christmas wrapping paper, or other coloured material, may be provided to slip over the container to make it less obvious under the tree.

The hat and upper body section detach. Clear buttons are provided for visual inspection of water level. Upper and lower body sections of snowman are detachable at the top line of belt. There is an airtight rubber lock ring between body sections. The body and support base are slide coupled locked together. A plastic flexible drain hose protrudes from bottom of lower body section. This is the water feed line to the tree. The support base has a decorative exterior. A recessed notch is also included for easy clearance of the drain tube to tree. The circumferential distance of the coupling lip is approximately 9/20 of total circumference. The cross-section of the support base shows the coupling support lip. There is male threading for screwing onto upper body female threaded section with an airtight rubber lock ring therebetween. The hat of the SNOWMAN is also the airtight threaded filler cap, secured to the upper body section at an airtight rubber lock ring. The upper body includes a female thread for fastening to lower body section.

CONCLUSION

From the foregoing description, one skilled in the art can easily ascertain the essential characteristics of this invention, and without departing from the spirit and scope thereof, can make various changes and modifications of the invention to adapt it to various usuages and conditions. Consequently, such changes and modifications are properly, equitably, and "intended" to be, within the full range of equivalence of the following claims.

I claim:

1. An automatic waterer for trees or plants adapted to be connected to a stand which holds a tree in an upright position and collects water, said waterer comprising: a hollow support base, said support base having a ceiling, a peripheral rim and an arcuate coupling support lip spaced vertically above said ceiling to provide a slot therebetween; a lower body section, said lower body section having a lower slide-coupled lip and an upper male threaded neck, said lower body including an inner lower roof, said roof having an off-center aperture therein leading to a downwardly-sloping channel, said channel having internal threads to connect it to an externally-threaded flow controller which is connected to a hose; said lower body section being assembled to said support base by cooperative engagement between said slide-coupled lip of said lower body section and said coupling support lip of said lower body section, thereby providing cooperative airtight and water tight interconnection; an upper body section including an integral superposed head, said upper body section including a lower base having female threads therein and an upper neck integral with said upper head, said upper neck having male threads thereon; said upper body being assembled to said lower body by engagement between said upper male threaded neck of said lower body section and said female threads of said upper body section with an interposed lock ring, thereby providing cooperative airtight and watertight interconnections; and an upper hat, said has having an inner well provided with inner threads; said upper hat being assembled to said upper body by engagement between said male threads of said upper body section and said internal threads of said hat with an interposed lock ring, thereby providing cooperative airtight and watertight interconnection; said hose being adapted to be connected between said flow controller and said stand; said automatic waterer operating without further power input to allow water to flow automatically from the interior of said lower body to said stand, said water flow being self-powered by means of an airlock.

2. The automatic waterer of claim 1 including a plurality of vertically-spaced-apart, transparent viewing ports forming part of said lower body and part of said upper body for visual inspection of the level of water within said upper and lower bodies.

3. The automatic waterer of claim 1 wherein said downwardly sloping channel slopes to an angle of about 45°.

4. The automatic waterer of claim 1 wherein said flow controller is provided with a manually rotatable on/off valve for preventing automatic water flow.

5. The automatic waterer of claim 1 wherein said flow controller is provided with a push button on/off valve for preventing automatic water flow.

6. The automatic waterer of claim 1 in combination with said stand which holds a tree in an upright position, said stand including a clip to secure said hose thereto.

* * * * *